US010652614B2

(12) United States Patent
Ward

(10) Patent No.: US 10,652,614 B2
(45) Date of Patent: May 12, 2020

(54) SYSTEM AND METHOD FOR CONTENT DELIVERY OPTIMIZATION BASED ON A COMBINED CAPTURED FACIAL LANDMARKS AND EXTERNAL DATASETS

(71) Applicant: Shoppar, Ltd., Shenfield, Essex (GB)

(72) Inventor: Ville Peter Aarimaa Ward, Essex (GB)

(73) Assignee: Shoppar, Ltd. (GB)

( * ) Notice: Subject to any disclaimer, the term of this patent is extended or adjusted under 35 U.S.C. 154(b) by 0 days.

(21) Appl. No.: 16/285,691

(22) Filed: Feb. 26, 2019

(65) Prior Publication Data
US 2019/0281350 A1 Sep. 12, 2019

Related U.S. Application Data

(60) Provisional application No. 62/639,128, filed on Mar. 6, 2018.

(51) Int. Cl.
| H04N 21/4402 | (2011.01) |
| H04N 21/4223 | (2011.01) |
| H04N 21/435 | (2011.01) |
| H04N 21/442 | (2011.01) |
| H04N 21/845 | (2011.01) |
| H04N 21/45 | (2011.01) |

(52) U.S. Cl.
CPC ... *H04N 21/44029* (2013.01); *H04N 21/4223* (2013.01); *H04N 21/435* (2013.01); *H04N 21/44218* (2013.01); *H04N 21/4532* (2013.01); *H04N 21/8455* (2013.01)

(58) Field of Classification Search
CPC ......... H04N 21/44029; H04N 21/4223; H04N 21/435; H04N 21/44218; H04N 21/4532; H04N 21/8455
See application file for complete search history.

(56) References Cited

U.S. PATENT DOCUMENTS

| 2004/0088726 | A1 | 5/2004 | Ma et al. |
| 2011/0072448 | A1 | 3/2011 | Stiers et al. |
| 2012/0324492 | A1* | 12/2012 | Treadwell, III ........ H04H 60/45 |
| | | | 725/10 |
| 2014/0351836 | A1 | 11/2014 | Hayashida |
| 2016/0053914 | A1 | 2/2016 | Jing et al. |
| 2016/0267532 | A1 | 9/2016 | Saccoman |
| 2016/0323643 | A1* | 11/2016 | Panchaksharaiah ......... |
| | | | H04N 21/44016 |
| 2018/0295420 | A1* | 10/2018 | Rumreich .......... H04N 21/8547 |

* cited by examiner

*Primary Examiner* — Kunal Langhnoja
(74) *Attorney, Agent, or Firm* — Marin Patents, LP; Gustavo Marin

(57) ABSTRACT

A system and method to turn computer vision captured data of a subject into an optimized rearranged media content to a display device using historic or real-time data points captured by facial analytics software comprising a media compiler computer that receives a digital media segment and metadata describing the digital media segment, the metadata comprising, at least, a priority marker for each frame of a plurality of frames and one or more set durations and create a new digital media segment by rearranging at least a portion of the plurality of frames in combination with additional elements such as generated text, zooming in on focal items within the media and other techniques for highlighting key elements of the new digital media segment, the rearrangement based on priority markers associated to each frame and other pre-configurations.

18 Claims, 14 Drawing Sheets

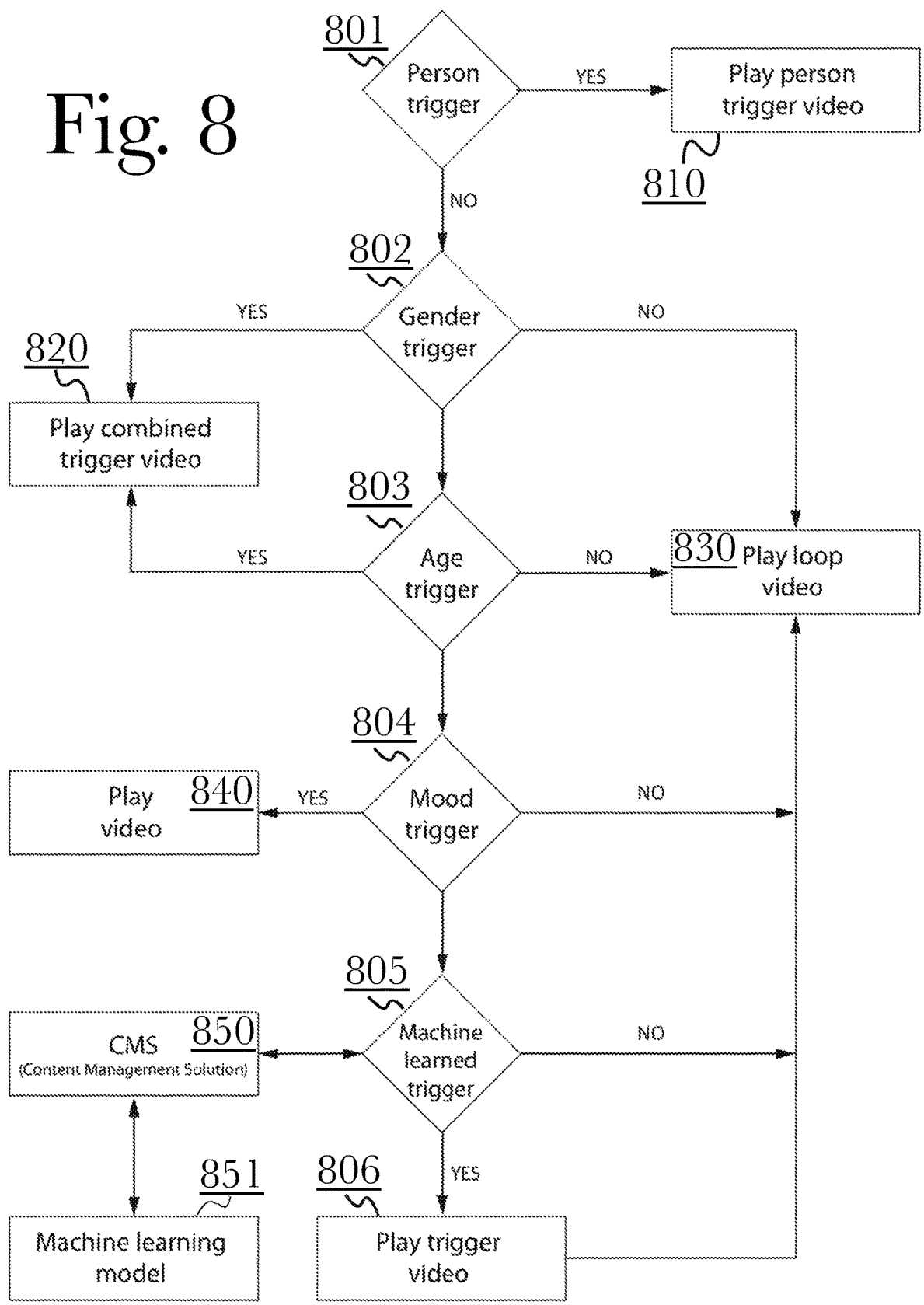

SYSTEM AND METHOD FOR CONTENT DELIVERY OPTIMIZATION BASED ON A COMBINED CAPTURED FACIAL LANDMARKS AND EXTERNAL DATASETS

CROSS-REFERENCE TO RELATED APPLICATIONS

This application claims the benefit of, and priority to United States Provisional Patent Application Ser. No. 62/639,128, filed Mar. 6, 2018, entitled "SYSTEM AND METHOD FOR CONTENT DELIVERY OPTIMIZATION BASED ON A COMBINED CAPTURED FACIAL LANDMARKS AND EXTERNAL DATASETS", the entire specification of which is incorporated herein by reference in its entirety.

BACKGROUND

Field of the Art

The disclosure relates to the field of delivering digital media based on attention conditions and influencing data sets, and more particularly to the field delivering automatic compiled digital media based on real-time attention conditions and influencing data sets.

Discussion of the State of the Art

In the field of artificial intelligence (AI) content generators have emerged as the offspring of word spinners. These were often free services where users could place text and the website would find synonyms for most words used in the sample. A problem with known systems in the art, is that these words would be replaced without taking the context into account and, more often than not, result in a piece of text which makes little to no sense at all. Word spinners have evolved into AI Content generators that take existing content and rewrite and shuffle it around to create new content. Content can come from a variety of sources including answers from questions on social media and forums.

Automated content generation is becoming prominent in other forms of media, such as video. For example, providers of video automation tools are commonly used for creating text-based videos; however, these services are not without their limitations; relying on the AI to convert text-to-video can create some sub-standard results, so there is still a need for human input, particularly for organizations with a higher reputation.

Brands such as The Wall Street Journal™, TopFan™ and Pandora™ are using AI strategies to boost conversion rates and identify audience preferences. Specifically, Pandora uses AI-fueled machine learning algorithms to program new songs that listeners will enjoy. This strategy combines human input with AI technology to filter out recordings that are either duplicates or of lesser quality.

There are factors which inherently prevent AI content generators from completely phasing out human writers completely. To begin with, content produced by artificial intelligence often lacks the flair added by human writers to make articles more engaging to read; writers have anecdotes they can include to create a more emotional response. Other problems include the cost of producing AI content and robots lack the influence well known writers would have.

What is needed is a system and method to understand attention conditions of subjects viewing media by capturing and analyzing video of the subjects, and to dynamically resequence, in real-time, new media segments based on attention information associated to identified viewers in combination with additional elements to highlight priority elements within media such that viewers will see information in a priority sequence based on parameters set within the video. Said differently, what is needed are systems and methods for content creators to ensure that the most relevant and important portions of media, with additional elements to highlight content, are consumed first and based on specific behaviors of viewers.

SUMMARY OF THE INVENTION

The inventor has conceived and reduced to practice, in a preferred embodiment of the invention, a system and method to turn computer vision captured data of a human subject into delivered content that is received by that person in an optimized format. According to a preferred embodiment of the invention, a digital media arrangement system based on an attention condition and influencing data sets, is disclosed, comprising a media compiler computer comprising a memory, an image capture component, a display component, one or more processors, and a plurality of programming instructions, the plurality of programming instructions stored in the memory and when executed by the one or more processor, cause the one or more processor to receive a digital media segment and metadata describing the digital media segment, the metadata comprising, at least, a priority marker for each frame of a plurality of frames and one or more set durations, each set duration being an amount of time associated to a set of frames from an administrator device. The media compiler computer may be further operable to capture images of subject for facial recognition and facial analytics, or users and identifying a user profile associated to the user, the user profile comprising, at least, one or more attention conditions; The frame media compiler computer may be further operable determining a sequence of frames based on a first attention condition of the one or more attention conditions and influencing data sets to compile a new digital media segment by rearranging at least a portion of the plurality of frames, the rearrangement based on priority markers associated to each frame, and then displaying the new media segment to a display component wherein the set of associated to a same priority marker.

In a preferred embodiment, an attention condition comprises a duration of time based on a timed calculation of a user's head position being in an in-angle arrangement.

In some embodiments, the attention condition may be an average duration of time based on a calculation of a plurality of durations of a user's head position in an in-angle arrangement or based on historical information from a user profile.

In a preferred embodiment, the new digital media segment comprises a sequence of frames wherein the total duration of time of the sequence of frames is equal to or less than a duration associated to the first attention condition.

In some embodiments, no rearrangement of the video segment is performed.

In some embodiments, an influencing data set may comprise behavior, computed mood of an individual, number of people present, a time-of-day, a location, a demographic information associated to the user, and other items described herein;

In some embodiments, additional elements may be used to optimize and emphasize attention-based and importance-based information.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting of the scope of the invention or the claims herein in any way.

FIG. 8 is flow diagram outlining trigger functionality, according to a preferred embodiment of the invention;

DETAILED DESCRIPTION

Figure 1:
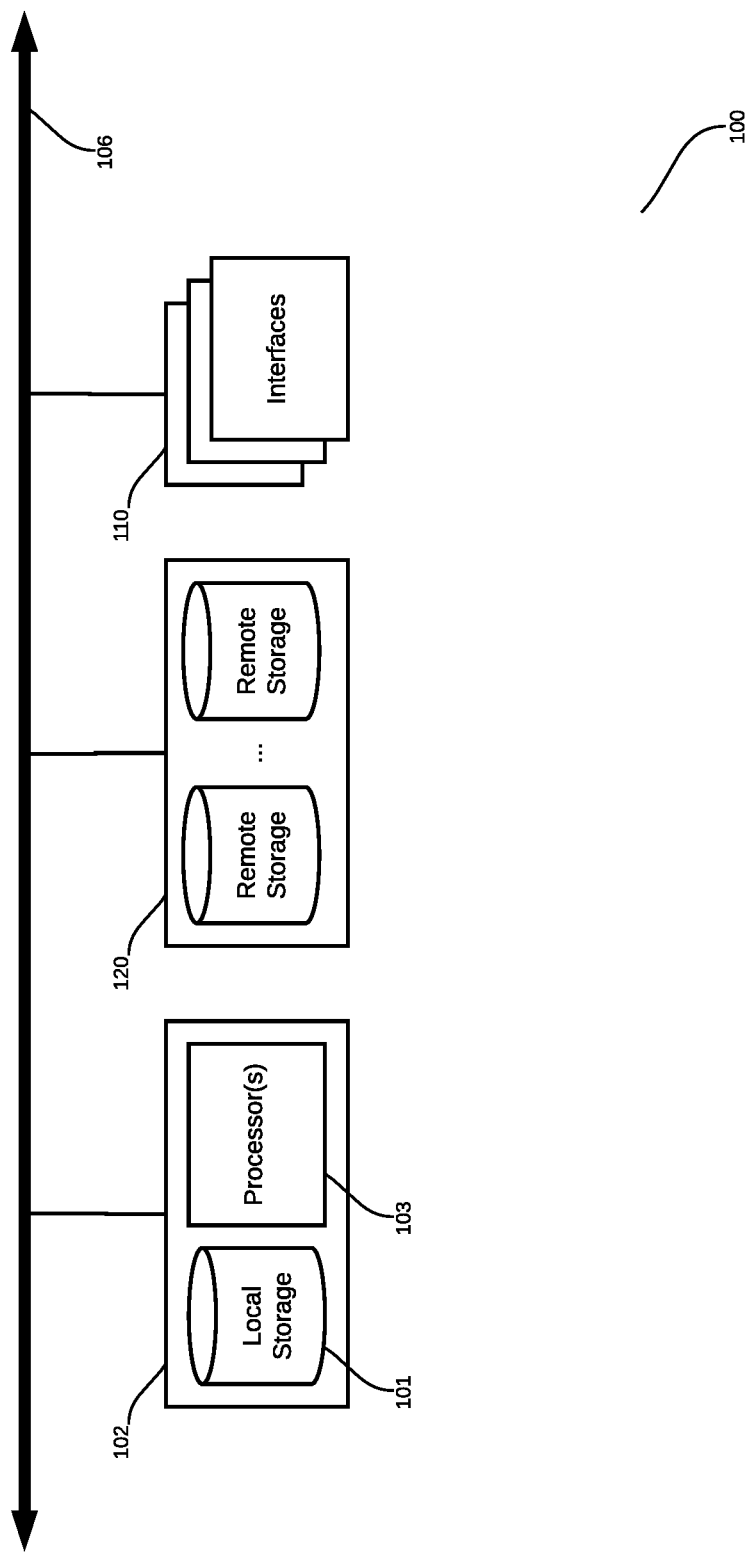
FIG. 1 is a block diagram illustrating an exemplary hardware architecture of a computing device used in an embodiment of the invention.

The inventor has conceived, and reduced to practice, a system and method to turn computer vision captured data of a human subject into delivered content that is received by that person in an optimized format, in the form of a combination of algorithms.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random-access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
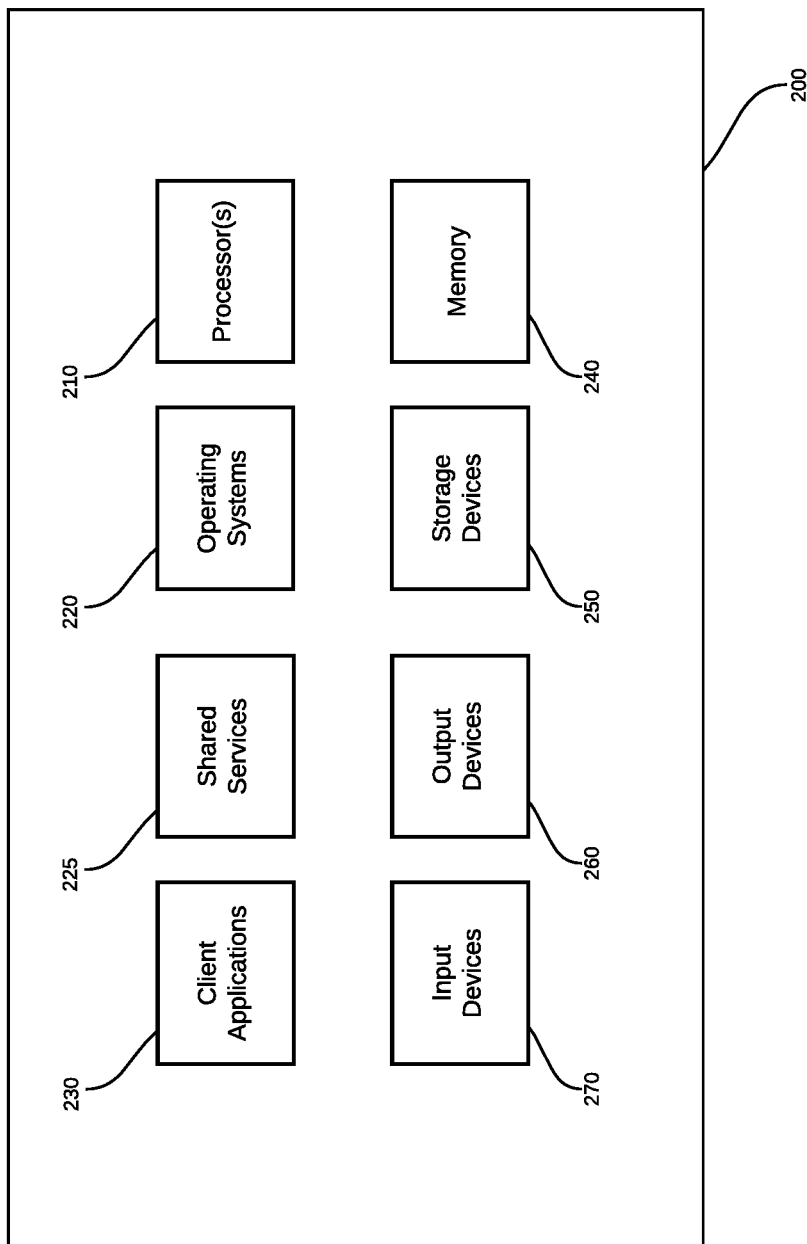
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200 and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
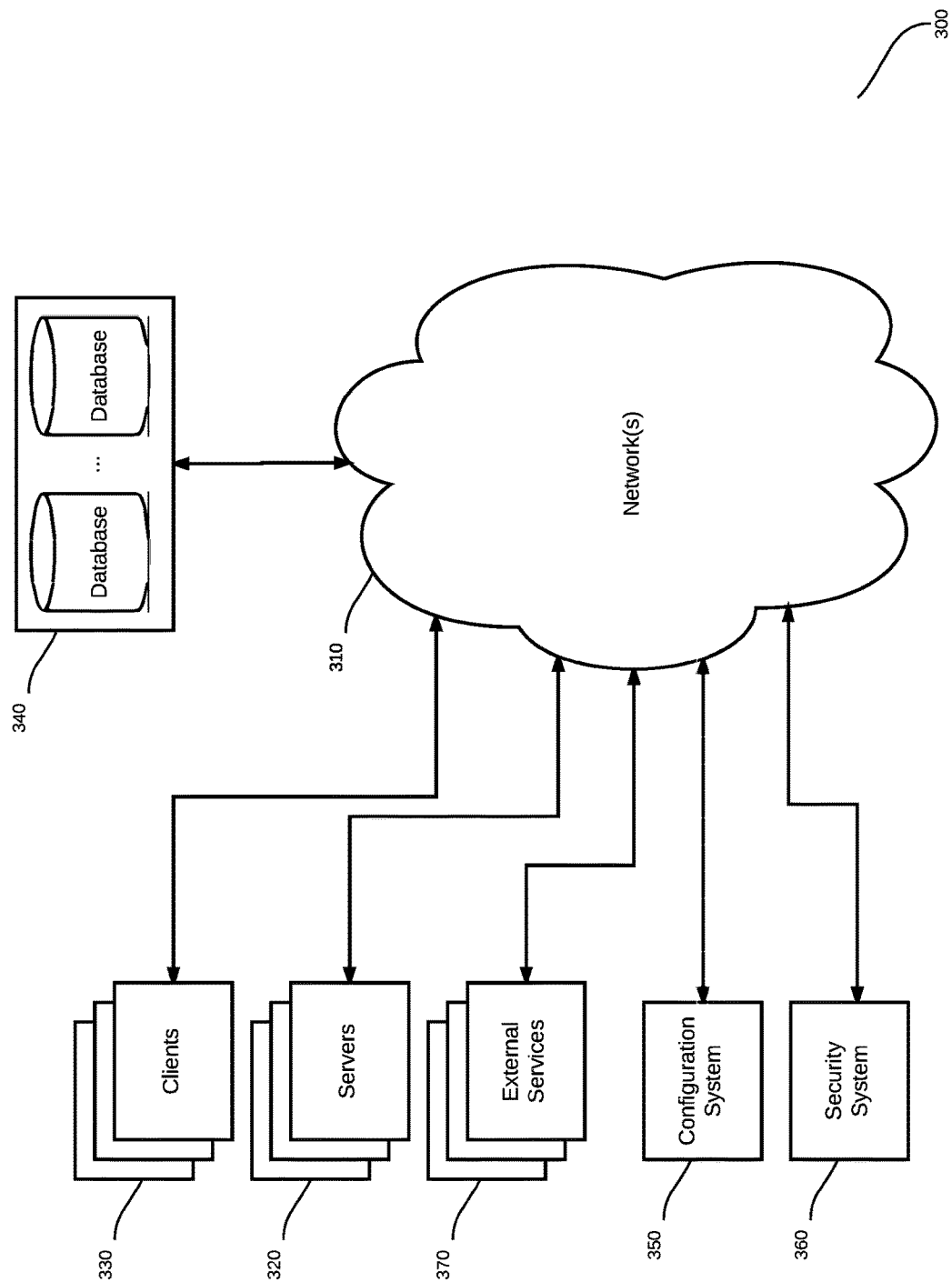
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation unless a specific security 360 or configuration system 350 or approach is specifically required by the description of any specific embodiment.

Figure 4:
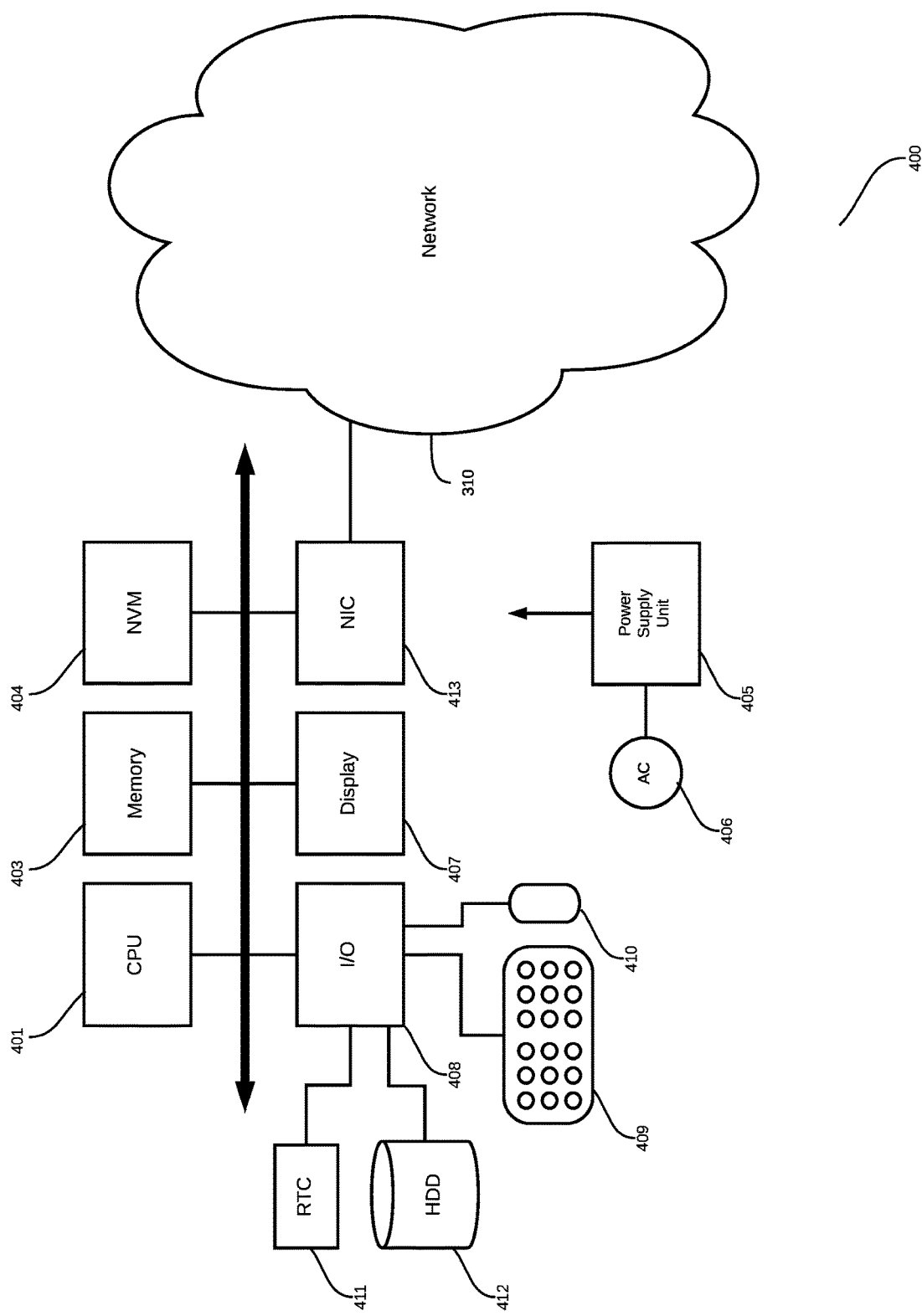
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. Central processing unit (CPU) 401 may be electronic circuitry within a computing device that carries out the instructions of programmable instructions by performing arithmetic, logic, controlling, and input/output (I/O) operations specified by the instructions. In some embodiments, CPU 401 may be an intelligent processing unit (IPU) to facilitate processing of machine learning implementations more efficiently by, in some embodiments, modeling data of knowledge as graphs, with each vertex a measure of the probability of a particular feature and the edges representing correlation or causation between features. In this regard, each vertex links to only a few others so the graph may be described as sparse. Massively parallel processing is commonly used in applications with graphs, allowing work on multiple edges and vertices at the same time. Accordingly, calculations may be carried out in small words—often half-precision floating-point—so that low-precision data in a high-performance computing environment which may be unlike traditional high-performance computing. Accordingly, the IPU is optimized for massively parallel, low-precision floating-point compute, and so it provides much higher compute density than other solutions. In some embodiments, an IPU may hold a complete machine-learning model inside the processor and may have over $100x$ more memory bandwidth than other solutions. This results in both lower power consumption and much higher performance. In some embodiments, CPU 401 may be one or more graphics processing unit (GPU) comprising specialized electronic circuit designed to rapidly manipulate and alter memory to accelerate the creation of images in a frame buffer intended for output to a display device 407. In some embodiments, GPUs may be used in embedded systems, mobile computing devices, specially designed computers, workstations, and gaming consoles, and other computing devices. Such GPUs may be very efficient at manipulating computer graphics and image processing or be used for single instructions multiple data (SIMD) arrangement for faster processing. The highly parallel structure of multiple GPUs may make them more efficient than other CPUs for algorithms that process large blocks of data in parallel. In a personal computer, a GPU can be present on a video card or embedded on the motherboard. In certain CPUs, they may be embedded on the CPU integrated circuit. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410 (or in some embodiments, a human interface device), hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5A:
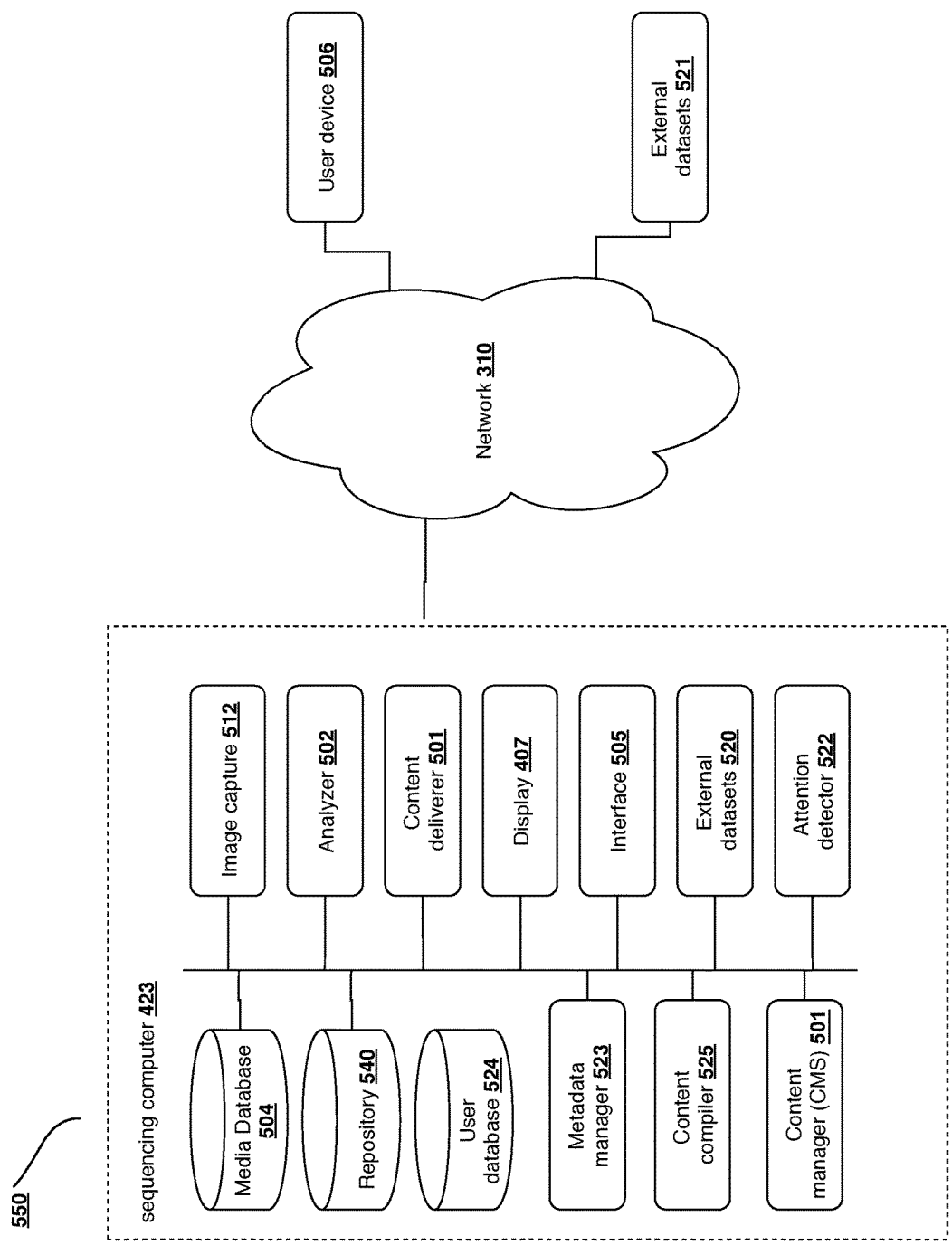
FIG. 5A is a block diagram illustrating an exemplary system architectural arrangement of system components, according to a preferred embodiment of the invention.

FIG. 5A is a block diagram illustrating an exemplary system architectural arrangement of system components, according to a preferred embodiment of the invention. According to the embodiment, a digital media arrangement system 550 based on an attention condition comprises a media compiler computer 423 a memory 403, an image capture component and/or one or more sensing components 512, a display component 407, one or more processors 210, and a plurality of programming instructions. Image capture component 512 is operable to receive images and convert them to digital media; however, in some embodiments, systems and methods described herein may operate over a live image feed without any image or images stored or recorded. It should be appreciated by one with ordinary skill in the art that capturing digital images, also known as digitization is the process of creating a digital image file directly using a camera, or scanner. Components 512 may comprise, but not limited to, infrared (IF) image capture, 3D image capture, and further comprise additional sensing elements like WiFi, Bluetooth, network signal sensors that, for example, can be used for tracking of individuals. The digitization process may require both hardware and software and may be a creation of a digitally encoded representation of the visual characteristics of an object such as a physical scene, the interior structure of an object, a person or group of people, or some other object. The term is often assumed to imply or include the processing, compression, storage, printing, and display of such images. A key advantage of a digital image, versus an analog image such as a film photograph, is the ability to process understand characteristics of the image to, at least, improve the computer to perform business functions. Algorithms described herein disclose systems and methods to gain high-level understanding from the captured digital images or videos to programmatically acquire, process, analyze and understand captured digital images, and extraction of high-dimensional data from particular environments in order to produce numerical or symbolic information. Understanding in this context means the transformation of visual images, by media compiler computer 423, into descriptions of business environments that can interface with thought processes of subjects within the images to elicit intelligent appropriate action. This image understanding can be seen as the disentangling of symbolic information from image data using models constructed with the aid of geometry, physics, statistics, and learning theory.

Further according to the embodiment, metadata manager 523 may receive a plurality of metadata describing a digital media segment comprising a plurality of captured images (for example, digital video) captured by image capture component 512, the metadata comprising, at least, a priority marker for each frame (or image) of a plurality of frames (or video) and further comprise one or more set durations, each set duration being an amount of time associated to a set of frames, the set of frames comprising one or more frames, or at least a portion of the plurality of frames. In an embodiment where a plurality of images comprising human subjects is captured, facial analytics may be used to identify, using one or more images, a user profile associated to the user, the user profile comprising, at least, one or more attention conditions. It should be noted that, in some embodiments, data collected in systems and methods described herein may be captured in an anonymous fashion to adhere to local data privacy laws. For example, any personal identifying information may not be included, may be obfuscated or encrypted using encryption methods known in the art. A facial analytics system, by analyzer 502, comprises computer vision technology capable of identifying or verifying a person from one or more digital image, a plurality of images, a video frame from a video source, and the like. Analyzer 502 may utilize multiple methods of facial recognition systems work, but in general, a comparison of selected facial features from given image with faces within user database 524, or within a user profile from user database 524. In some embodiments, a biometric artificial intelligence, as is known in the art, may be used to uniquely identify a person by analyzing patterns based on a person's facial textures and/or shape.

In some embodiments, media compiler computer 423 may be a cloud-based service receiving images from and delivering media to a mobile user device 506; however, in other embodiments media compiler computer 423 may reside at least partially on a specially programmed computer (for example, a self-contained advertisement display unit) with at least an attached image capture component 512 and display 407 or reside at least partially within a mobile device 506. An advantage to systems disclosed herein is its contactless and non-invasive process to capture images, recognize one or more users, and process/compile sets of frames. In other embodiments, systems may include advanced human-computer interaction (for example, behavioral analysis, product interactions, object (non-screen) related interactions, and the like), video surveillance, automatic indexing of images and/or frames, and video database, among others.

Figure 6A:
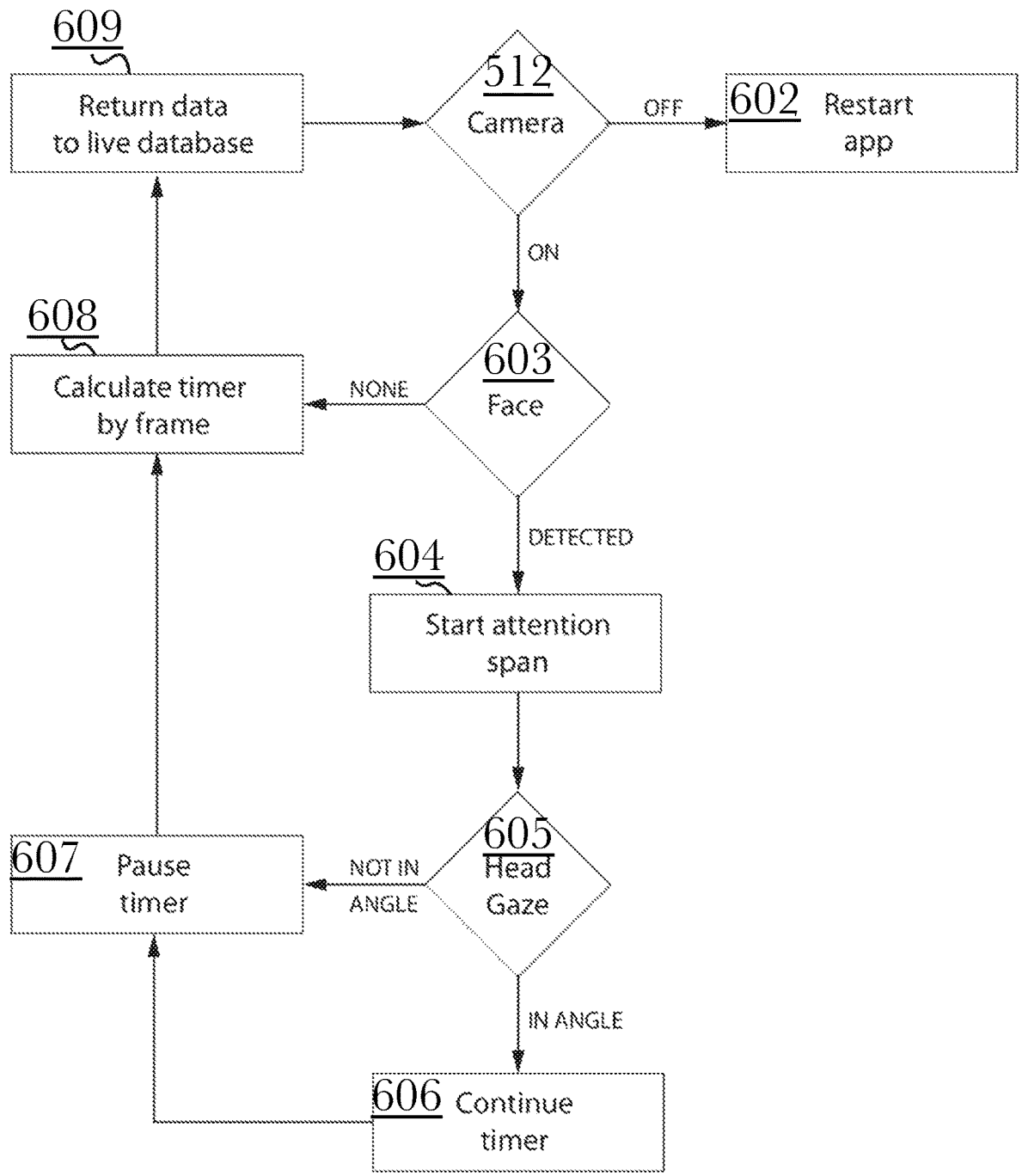
FIG. 6A is a flow diagram illustrating a calculation of an attention condition, according to a preferred embodiment of the invention.
Figure 9A:
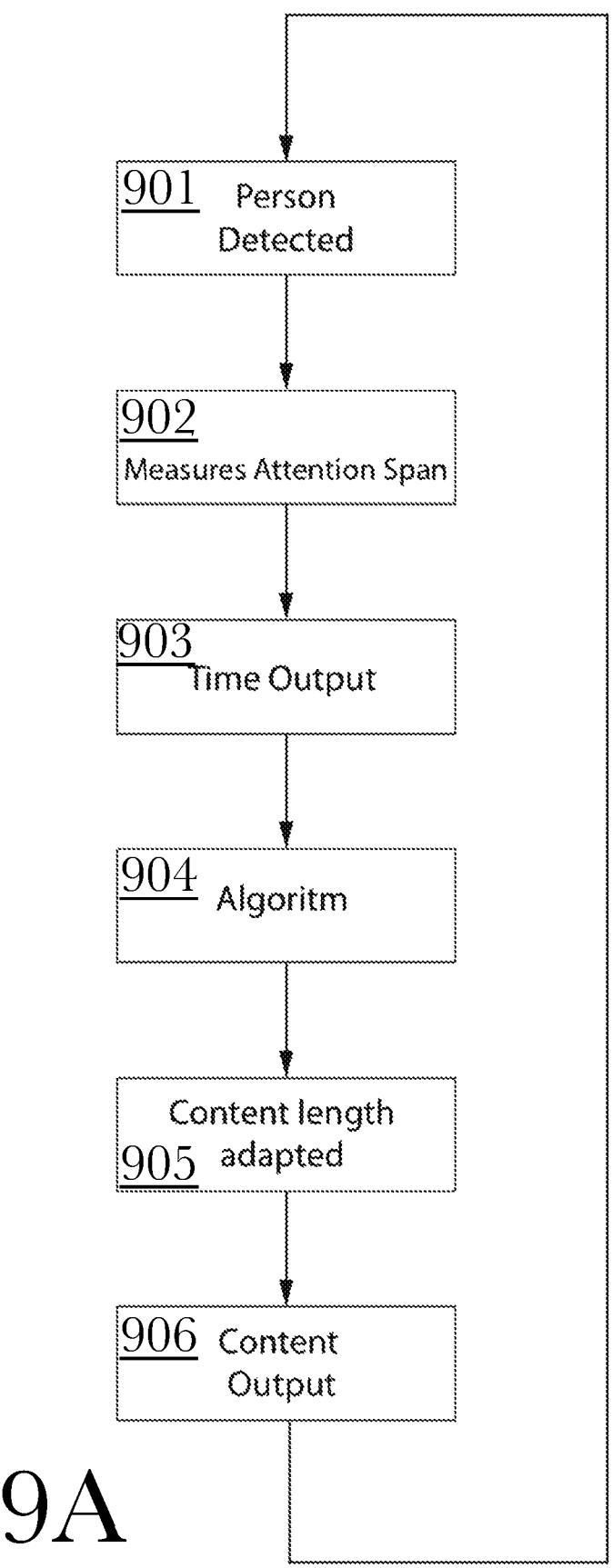
FIG. 9A is a flow diagram illustrating a smart content delivery mechanism, based on an attention condition, according to a preferred embodiment of the invention.
Figure 9B:
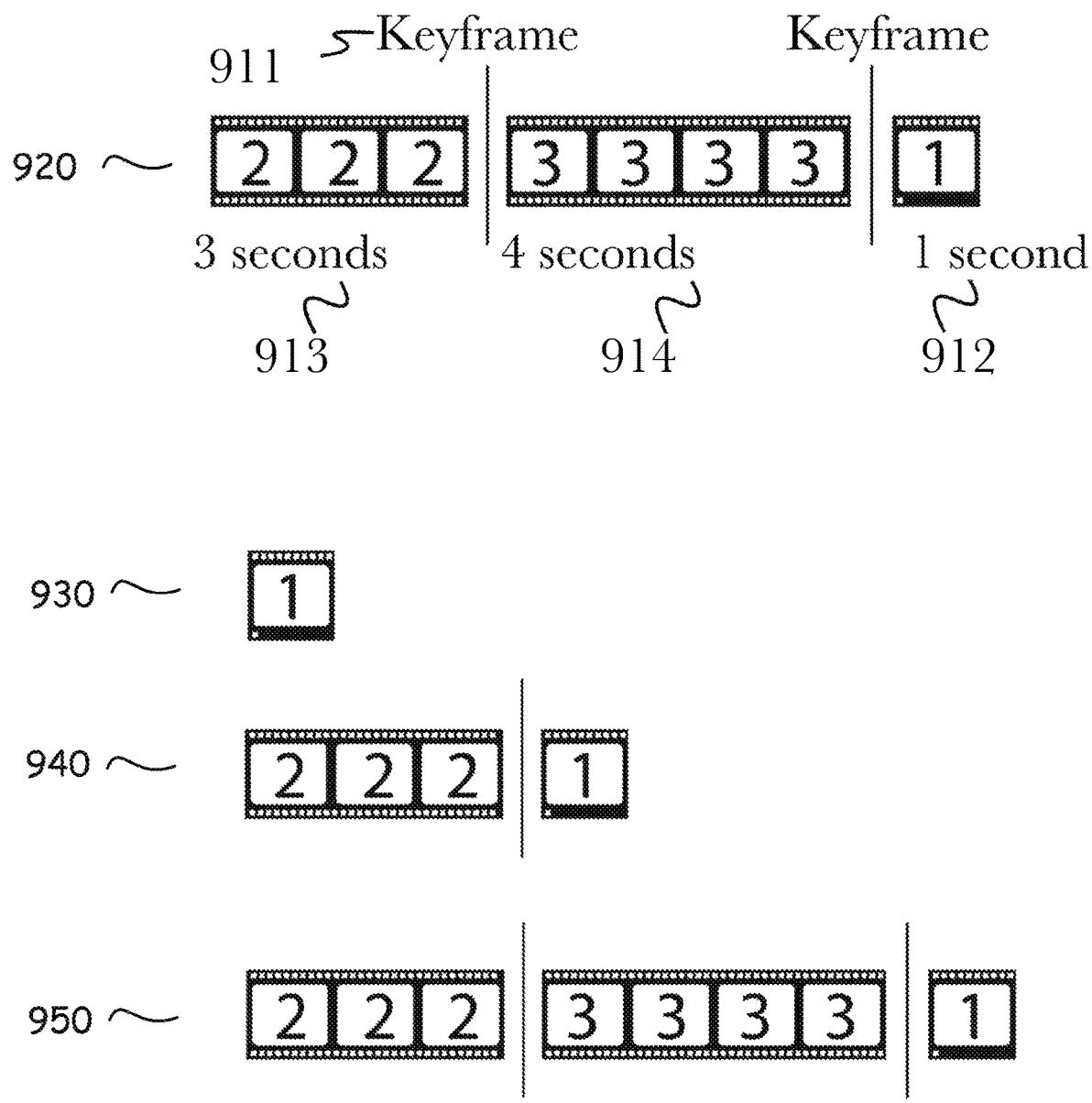
FIG. 9B is an illustration showing the optimization of video content, according to a preferred embodiment of the invention.

In a preferred embodiment, one or more attention conditions comprising at least an attention span may be computed, real-time by attention detector 522, to determine details of an attention level for a user identified in one or more of the captured images for one or more subjects within the images (see FIGS. 6A and 9). Media compiler computer 423 further comprises content compiler 525 for compiling a new digital media sequence or segment by rearranging at least a portion of the plurality of frames or subsegments or clips of a pre-configured file or from stored, streaming video, or a combination of both, the rearrangement optionally including, but not limited to, additional elements such as generated text, zooming in on focal items within the media (for example, products, people, graphics, images, one or more frames, etc. as described in FIGS. 10A and 10B), and other techniques for emphasizing key elements of the content. It should be noted that, in some embodiments, the additional elements may be preconfigured or directed or determined via metadata or in some other fashion. In a preferred embodiment, the compiling, recompiling, and/or rearrangement may be based, at least, on priority markers associated to one or more frames as well as an importance and/or attention rating for additional elements (as described in FIGS. 10A and 10B) in conjunction with details from the attention condition. In some embodiments, compiler 525 may compile simultaneously as the attention condition is detected. Media compiler computer 423 further comprises a content deliverer 501 for delivering content, for example, a compiled, or at least a portion of an original digital media to display 407. In some embodiments, content deliverer may deliver the digital media to user device 506. Media compiler computer 423 may further comprise interface 505 for displaying a dashboard of information to, for example, an administrator device (via a user device 506). Such a dashboard may be operable to receive digital media for use by media compiler computer 423, allow keyframe 911 markers to be assigned to digital media (see FIG. 9B).

Media compiler computer 423 may further comprise external datasets 520 for incorporating additional information such as location information (e.g. pre-configured and associated to media compiler computer 423, GPS coordinates from a device, geolocation, location information received by another network connected device), demographic information (for example, computed through facial recognition, received from a user profile from user database 524, or received from another network-connected device), mood information from facial recognition, financial information, social information such as accessing an identified user's information through common social media platforms such as Facebook™ or LinkedIn™. In some embodiments, external datasets 521 is used in lieu of or in conjunction with external datasets 520 to receive external information. In some embodiments, media compiler computer 423 may include additional elements as described in FIGS. 10A and 10B.

Media compiler computer 423 may further comprise media database 504 for storing media files uploaded by an administrator and media received from image capture component 512. Compiled media may be stored in media database 504 by content compiler 525. Media compiler computer 423 may further comprise repository 540 for storing datasets collected from external datasets 520, external datasets 521, or other sources. Media compiler computer 423 may further comprise user database 524 that may store user profile information for known user. Profiles may be associated to a user of user device 506 or be correlated with previous recognized users previously recognized by analyzer 502. User profiles may comprise attention information and be averaged over a number of recognized or computed attention conditions. It can be appreciated that, in some embodiments, compiler 525 may use an average attention span in requencing clips instead of methods described previously.

Media compiler computer 423 may further comprise content manager (CMS) 501 to collect metadata, manage external datasets and combine the collected information for algorithms disclosed herein.

Figure 5B:
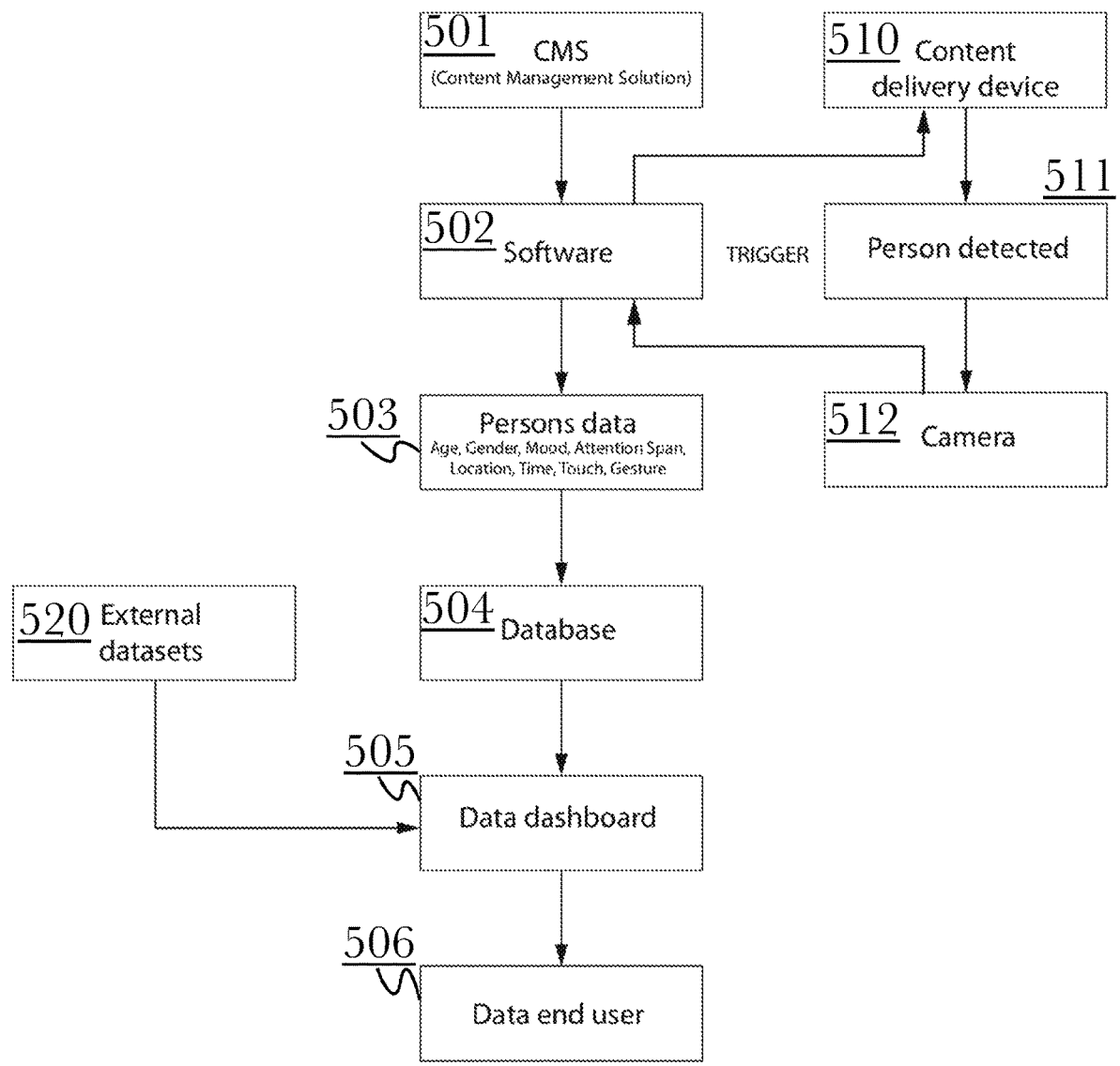
FIG. 5B is a block diagram illustrating an exemplary architectural arrangement of system components, according to a preferred embodiment of the invention.

FIG. 5B is a block diagram illustrating an exemplary architectural arrangement of system components, according to a preferred embodiment of the invention. According to the embodiment, a content management solution 501 may be used to present media content to users and may be enhanced through the use of facial analytics software 502 operating on a content delivery device 510 that may be any suitable computing device, for example, a mobile computing device or computer. Facial recognition may be used to calculate a person's information 503, for example, including but not limited to, age, gender, mood state, and attention span. This information may be collected via a camera 512 using computer vision (as described previously), which may for example be automatically triggered when a person is detected 511 (for example, using any of a variety of facial recognition techniques and, for example, an always-on camera). Collected data may then be timestamped, geolocated (if location information is available or may be derived from other available information (for example, from external datasets 520 and/or 521), and stored in a database 504, for example on a network-connected server (this provides a decentralized system where personal data may be stored separately from the facial recognition 502 or content management 501 components). Additional information may be incorporated from a variety of external datasets 520, including but not limited to, external geolocation or demographic information, and available information may be presented via a dashboard interface 505 to user device 506 such as a system administrator. Programming instructions when executed by the processor may cause the processor to use a content management solution (CMS) 501 to input and deliver content components (including, but not limited to, audio, video, images, virtual reality (VR), augmented reality (AR), games, social media, text, and the like), online servers to store the data, and data dashboards 505 to display the interpreted data.

Figure 5C:
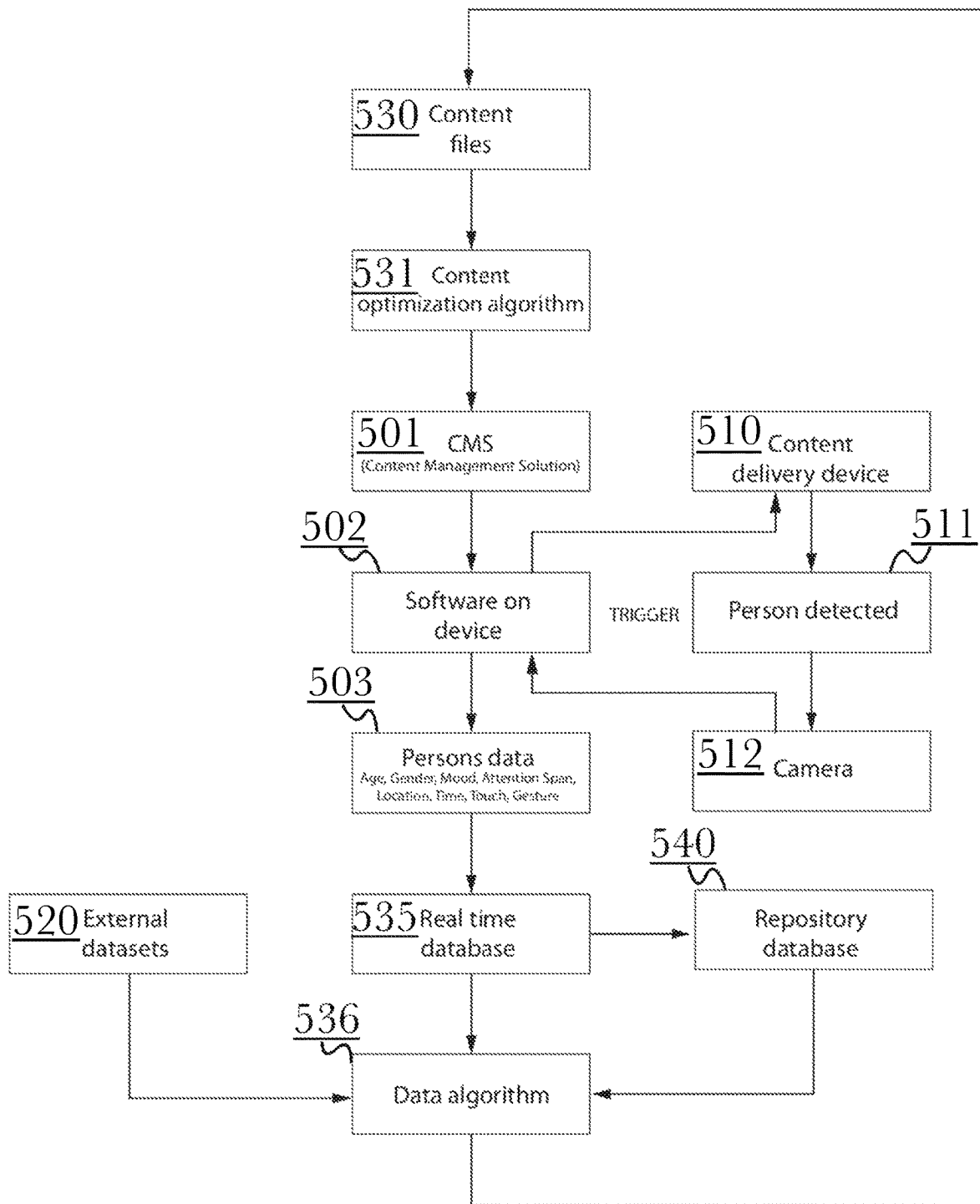
FIG. 5C is a block diagram illustrating an interaction of a plurality of algorithms as they relate to the data capture and the content delivery, according to a preferred embodiment of the invention.

FIG. 5C is a block diagram illustrating an interaction of a plurality of algorithms as they relate to the data capture and the content delivery, according to a preferred embodiment of the invention. According to the embodiment, when performing facial recognition and analytics, programming instructions 502 executed on a processor cause the processor to use facial landmarks and a head position to plot key feature locations and relate them to a method that predicts accuracy levels for each parameter (for example, selected facial features from a given image). Additional captured data points include screen interactions, gestures, movement, and interactions with, for example other people or objects (for example, a subject interacts with an object within the frame, such as a first subject picks up a can of Pepsi™ and a second subject picks up a can of Coca Cola™). Further to the captured data, a system and method may integrate additional external datasets 520 to enhance interpretation of a circumstance under which a user interacts with the content. These data points may include, but are not limited to, weather, public holidays, local events, traffic, or other information. All of the datasets, live (as retrieved from, and stored in, a real-time database 535) and historic (as may be retrieved from a repository 540 of historical data), may then be combined with a calculated attention span of the user (as digitally captured by the camera 512) to ensure that the key content messaging is delivered to that user. Users are interpreted by the facial analytics software and their calculated attention span may be sent to a server as metadata. A machine learned data interpretation algorithm 536 may detect and assesses patterns in the attention span fluctuations through a minute of the hour, hour of the day, day of the week, week of the year, and the like, to predict viewing habits of people on an associated piece of content, screen, and location. Further datasets 520 may be integrated in a predictive algorithm to a customer's demographic and viewing mood to compute how long to play a piece of content to actively engage viewers with the right content and the right time. It should be noted that the content may include one or more digital media restructuring formats that includes, but is not limited to, generated text, zooming in on focal items (for example, products, people etc.), and other techniques for highlighting key elements within the content. Additional external datasets 520 may also be added to the predictive algorithm 536 to improve accuracy. The predictive algorithm 536 may then utilize all collected data and analyses performed to select content files 530 for presentation, which may then be further refined through a content optimization algorithm 531 to present the optimum content based on the user data, attention span, and other analysis. Content may then be presented through the CMS 501, and operation continues.

Detailed Description of Exemplary Embodiments

FIG. 6A is a flow diagram illustrating a calculation of an attention condition, according to a preferred embodiment of the invention. According to the embodiment, a camera 512 operating on a media compiler computer 423 may be enabled and scanning for a human face 603 (also referred to herein as a subject). If the camera is disabled, a content delivery application may be restarted 602 to ensure the software is working properly and facial analytics are enabled. If no face is detected, a timer may be calculated based on the current frame of a media content file being presented 608, and this information is returned 609 to a real-time database 535 as operation continues. This operation causes timing information to be collected, identifying how long media content was presented before a user looked away (lack of a human face according to the camera 601), indicating a loss of attention. This information is collected and used in determining a subject's attention span, adding to data from when a subject's face was detected, which in turn indicates the beginning of user attention 604. In addition to the presence or lack of a face, gaze detection (see FIG. 6B) may be utilized 605 to identify where a subject may be looking, refining analysis of attention span by identifying not only when a subject is present, but also when they are actively viewing the content being presented. If the subject's face is "in angle" (that is, the face is determined to be at an angle indicating an attention condition or viewing), the attention span timer continues 606 and operation loops as shown. If the subject's face is determined to be not-in-angle, as when a user looks away, the timer may be paused 607 and then the subject's attention span may be calculated using the timer and frame information 608 and incorporated into the live database 609.

In some embodiments, gaze detection (and attention detection, in general) may utilize eye tracking by measuring either the point of gaze (where a subject is looking) or motion of an eye relative to a head associated to a subject. In this regard, an eye tracker process or device may be used to measure eye positions and eye movement as an input device for human-computer interaction. Though there are a number of methods for measuring eye movement that may be used, in such an embodiment, video images of a subject where an eye position is extracted may be preferable. Other methods may include search coils or based on the electrooculogram. In other embodiments, one or more overlay layers to control and adjust output at a pixel level (as is known in the art) may be used to incorporate and/or combine pixel masks, lenses, and/or a plurality of layers configurable as lenses to output specific portions of the display to a user's left and right eyes. For example, using gaze tracking technology, portions of a display and one or more matrix layers can be activated or deactivated to present different images to a user's left and right eye, and thus perform eye-tracking thereon. Other embodiments may use microlenses, circular lenses, panels with controlled liquid crystal density and the like.

Figure 6B:
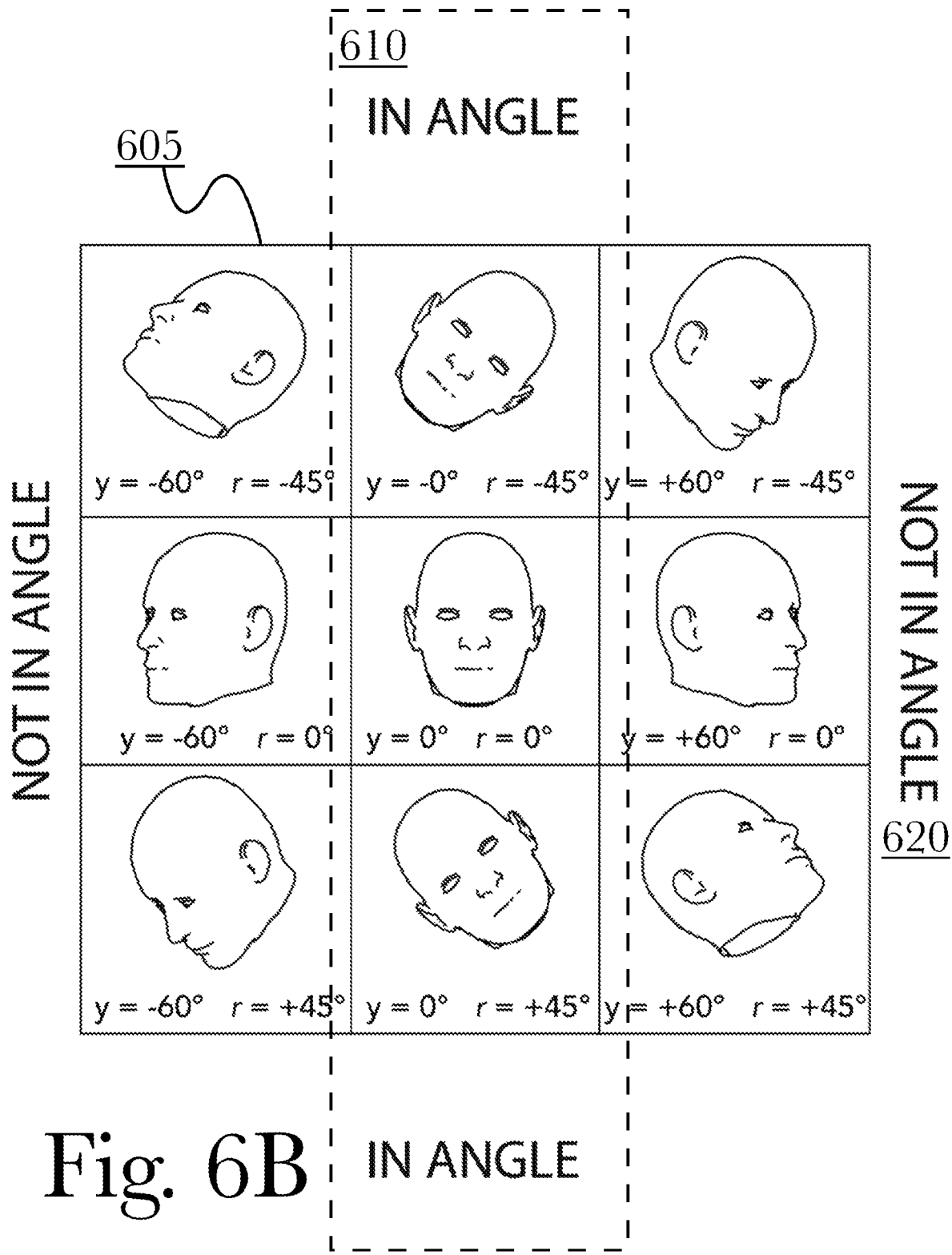
FIG. 6B is an illustration defining a head gaze angle, according to a preferred embodiment of the invention.

FIG. 6B is an illustration defining a head gaze angle, according to a preferred embodiment of the invention. According to the embodiment a plurality of digital images generated from a camera indicating a subject's head position are shown. Accordingly, a subject's attention may be inferred from the angle of their head and direction of their gaze, identifying when a subject's face may be within a camera frame, but their attention is directed at something other than the content file being presented. In some embodiments other types of tracking technology may be used such as eye tracking, and the like. A subject's face may be considered "in angle" 610 when their gaze is directed at the content being presented, even when the angle of their head may not be ideal (as shown). For example, the subject may be viewing content on a smartphone and holding the phone at an angle, or they may tilt their head during viewing (such as to read text in the media content that may be displayed at an angle). When a subject's gaze is directed in another direction, again regardless of the actual angle of the head, it may be identified as "not in angle" 620 and taken as an indication that the user's attention is focused elsewhere, that is, not focused on presented content. For example, the subject may become distracted and look away, or they may move their phone as they direct their attention elsewhere, causing the camera to identify that the subject's face is not in angle.

Figure 7:
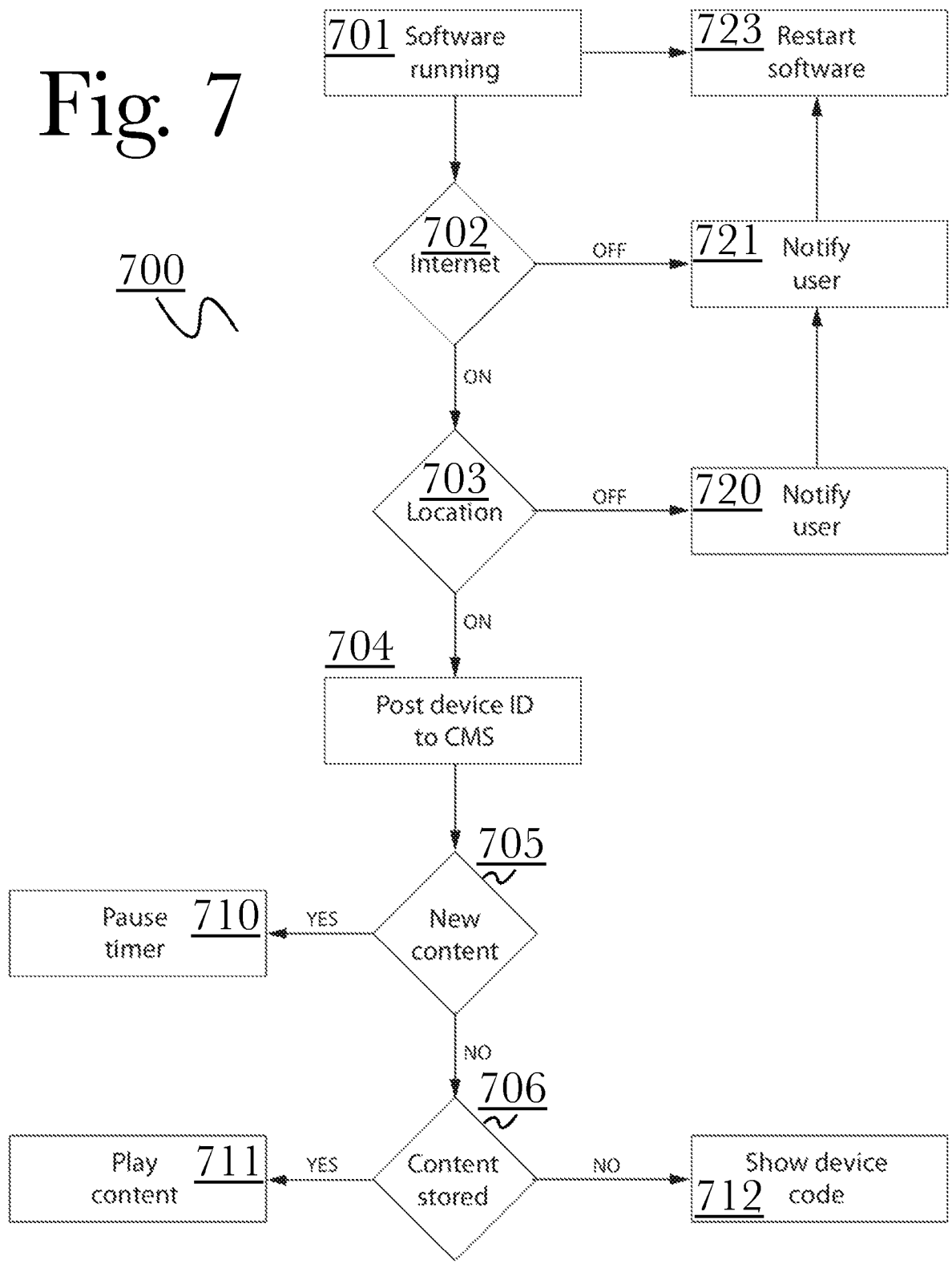
FIG. 7 is a block diagram illustrating a structure of a content management solution (CMS) logic, according to a preferred embodiment of the invention.

FIG. 7 is a block diagram illustrating a structure of a content management solution (CMS) logic 700, according to a preferred embodiment of the invention. According to the embodiment, in a first step 701, CMS 501 may be running on a content delivery device (for example a mobile computing user device 506). During operation, CMS 501 may check for Internet connectivity in step 702, and if the network connection is unavailable a notification may be presented to the user in step 721 (via the user device 506) prompting them to restart the software in step 723 (or, optionally, automatically restarting the software or components of the software such as a networking component that may be restarted individually). If connectivity is available, the CMS 501 may check for location services in step 703, and again if unavailable a user may be notified in step 720 and the software or necessary software component may be restarted in step 723. If location services are available, for example, GPS or network-based location services, a device ID may be provided to the CMS 501 in step 704 for use in identifying the particular device being used. In some embodiments, the location may be pre-configured (for example, when the system is stationary, such as in an electronic billboard configuration where content may be displayed to a plurality of subjects). The device ID may be a hardware ID such as an IMEI or MAC address, or it may be a fingerprint-type ID used to identify the particular device from available hardware or software details including, but not limited to, brand, model, screen size, hardware sensors, keyboard layout, battery capacity, or operating system version. CMS 501 then checks to see if there is new content selected for the device ID in step 705, and if so any running timers may be paused ins step 710 to allow the new content to play while attention span analysis runs. If no new content is available, CMS 501 may check for previously-stored content in step 706, and if available plays a stored content file in step 711. If no stored file exists, the device ID may be shown in step 712 so that content may be manually associated with the device ID (for example, so that an administrator may manually initiate a content store for the device, before letting content selection logic to take over and curate content going forward).

FIG. 8 is flow diagram outlining trigger functionality, according to a preferred embodiment of the invention. As shown, multiple nested trigger events may be used to select and present content to a user, with a reverse hierarchy from most general to most specific (such that the most-specific available trigger is used, and more generalized trigger conditions are used when the more specific conditions are not met). According to the embodiment, an initial trigger condition may check for the presence of a human user in step 801 (for example, by analyzing one or more digital images), playing an appropriate video in step 810 when a person is detected. If more specific information is available, a gender-based trigger condition may be checked in step 802, as well as an age-based trigger in step 803. If either of these triggers is met, a combined gender/age-based video may be presented in step 820, but if both conditions fail a fallback video loop may be shown instead in step 830. In addition to the video loop, further trigger conditions may be checked such as a mood trigger in step 804, which may play mood-specific content in step 840 when met (such as playing specific videos when a user is detected to be happy or excited, for example) or machine-learned triggers in step 805 which may vary according to machine learning from historical data, and may be based on arbitrarily-complex data points or combinations. Such complex additional triggers may be developed using a machine learning model in step 851 that is processed by CMS 501 in step 850 to train on data over time, and when any such triggers are met a trigger-specific video may be selected and played in step 806, before falling back to the video loop in step 830.

FIG. 9A is a flow diagram illustrating a smart content delivery mechanism, based on an attention condition, according to a preferred embodiment of the invention. As shown, operation of a content delivery mechanism may run in a cyclical fashion, iterating over content and data inputs continuously in a self-learning operation that adjusts as conditions change. In a first step 901, a subject (for example, a person) may be detected, by analyzer 502 from a plurality of images captured by image capture component 512. In some embodiment a profile corresponding to a user may be retrieved from user database 524. In a next step, 902, attention detector 522 may detect and measure the person's attention span (referring to FIG. 6A). In a next step 903, the attention is measure as a factor of time by attention detector 522. Data associated to attention span including at least the duration (i.e. the measured time factor) comprise the attention condition. In some embodiments an attention condition must meet predefined thresholds to determine whether a subject is in an attention condition. In some embodiments the attention condition may further comprise additional data associated to the attention condition, for example, head positioning information (as described in FIG. 6B), demographic information, a subset of durations of each position, and the like. In a next step 904, information from the attention condition, may be incorporated into a content selection sequencer (as described in FIG. 9B) to select digital media content segments for presentation in order to optimally compile, in step 905, one or more frames based on a computed attention span length, by content compiler 525. In some embodiments, step 904 may include additional elements as described in FIGS. 10A and 10B. In a next step 906, when an optimum sequence of content segments is determined, the resultant content may be presented to display 407 (or in some embodiments, to user device 506) for viewing. In a preferred embodiment, operation returns to step 901 to determine whether or not the subject is still in an attention condition. It should be appreciated that, in some embodiments, a plurality of attention conditions, or elements within one or more attention conditions may operate together, or separately, to affect the content algorithm. For example, a detected mood and/or gender may affect one or more attention conditions.

FIG. 9B is an illustration showing the optimization of video content, according to a preferred embodiment of the invention. According to the embodiment, a content optimization algorithm may split content segments using keyframes 911, dividing a plurality of frames, a digital media segment, a video, or the like into a subset of frames of varying length 912, 913, 914 that comprise logical subportions of the content (that is, a subset of frames, also referred to herein as a clip). In some embodiments, preconfigured metadata is pre-configured by metadata manager 523 describing one or more frames of the content, including, but not limited to, a duration of each segment, a priority, or the like. Accordingly, the subset of frames may be ranked by priority according to their relative importance, for example an informational clip with content that is deemed most important by the content creator, for example, key product features or information, company information, company contact information, a sales hook, a call to action, and the like, may be determined to be more important than, for example, a clip of a user interacting with a product, a coverage shot, and the like. In this regard, an ordered ranking of subset of frames within a single content file, may be compiled, by content compiler 525, into one or more combinations according to different attention conditions. It should be appreciated that importance of content segments and ranking may be learned and/or driven by data generated from the image/sensor analytics. In some embodiments a plurality of subset framed may be compiled using both current interaction data or historic data, or a combination of both, to inform content in advance of a target attention condition being computed or including additional elements ranked by importance and attention (referring to FIGS. 10A and 10B). In other embodiments, content compiler compiles a new media segment dynamically in real-time. When selecting content for presentation, the subset of frames may be retrieved and compiled based on an associated length of time and the calculated attention condition associated to a particular subject, such that the total length of all selected frames is less than or equal to the attention span. In some embodiments, additional elements may be included in the compiled media such as, but not limited to, text, zoom and other methods of highlighting the key message (as described in FIGS. 10A and 10B). Accordingly, if, for example, a user's attention span, for example, as determined by head gaze and/or eye tracking, is determined to be no more than one second long, the most-important one-second clip 912 may be selected and presented by itself, or first in a sequence of frames (e.g. in order, 912, 913, 914). If, however, the user's attention span is determined to be longer than, for example, one second but less than four seconds, the same one-second clip of highest importance 912 may be selected, as well as a three-second clip of next-highest importance 913, so that a total length of the compiled (i.e. stitched-together) content substantially matches the attention span of four seconds. If the user's attention span is longer still, the entire original media content of eight seconds may be compiled to reassemble the original video without rearrangement or deletion of frames, or in some embodiments a different sequence. As shown, the subset of frames may be played back in their original order so as to preserve the content and logical flow of the media, while ensuring that only the most important clips are shown based on the user's attention span.

In an exemplary embodiment, a first clip 920 may present a ranked whereby segment 1 912 (that is, a subset of frames comprising 912) is the most important segment, and segment 3 914 is the least important. In this regard, if the attention condition had an associated attention span of one second (or less), compiler 525 may isolate only the first segment 912 (that, is delete segments 2 913 and segment 3 914) and deliver only segment 1 912 as output media 930 to display 407.

In another exemplary embodiment, if the attention condition had an associated attention span of 4 seconds (or less), compiler 525 may compile segments 1 912 and 2 913 (thereby compiling a media output 940 of 4 seconds in total length) and deliver media 940 output to display 407.

In yet another exemplary embodiment, if the attention condition had an associated attention span of 8 seconds (or less), compiler 525 may compile segment 1 912, segment 2 913, and segment 3 914 (thereby compiling a media output 950 of 8 seconds in total length) and deliver media 950 output to display 407.

Figure 10A:
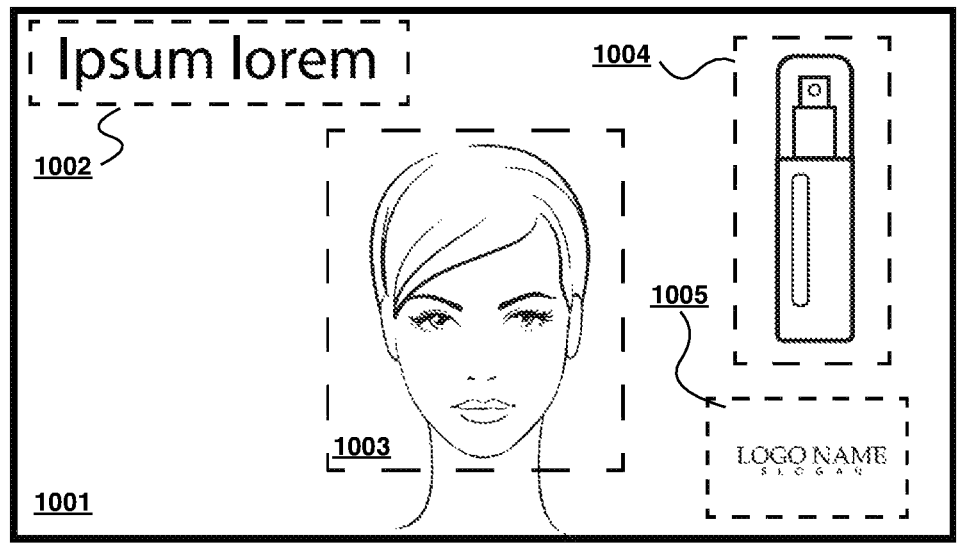
FIG. 10A is an illustration showing an exemplary arrangement of additional elements according to a preferred embodiment of the invention.

FIG. 10A is an illustration showing an exemplary arrangement of additional elements according to a preferred embodiment of the invention. According to the embodiment, arrangement 1001 may represent one or more visual elements such as text overlay, overlay of still images, focused video segments, graphic overlay such as a logo or other graphical item, and the like. These visual elements may then be placed or overlaid in a priority sequence based on attention and importance ranking in a video segment for visual emphasis as priority elements, within media, such that viewers may see information in a priority sequence based on parameters set within the video (referring to FIG. 10B). Accordingly, arrangement 1001 may comprise on or more text overlay sections 1002 comprising a plurality of letters, words or phrases (for example, words associated to a product offering); one or more image overlay sections 1003 comprising a focus to a segment of video or an overlaid still image, or a combination of both (for example, an image or frame of a user of the product offering); one or more image overlay section 1004 comprising an overlaid still image (for example, the product offering); one or more graphical sections 1005 comprising a graphical item such as a logo or a log combined with letters (for example, a logo for a company providing the product offering). It should be appreciated by one with ordinary skill in the art that elements 1002, 1003, 1004 and 1005 illustrate an exemplary embodiment and that any number of these elements may be arranged within arrangement 1001.

Figure 10B:
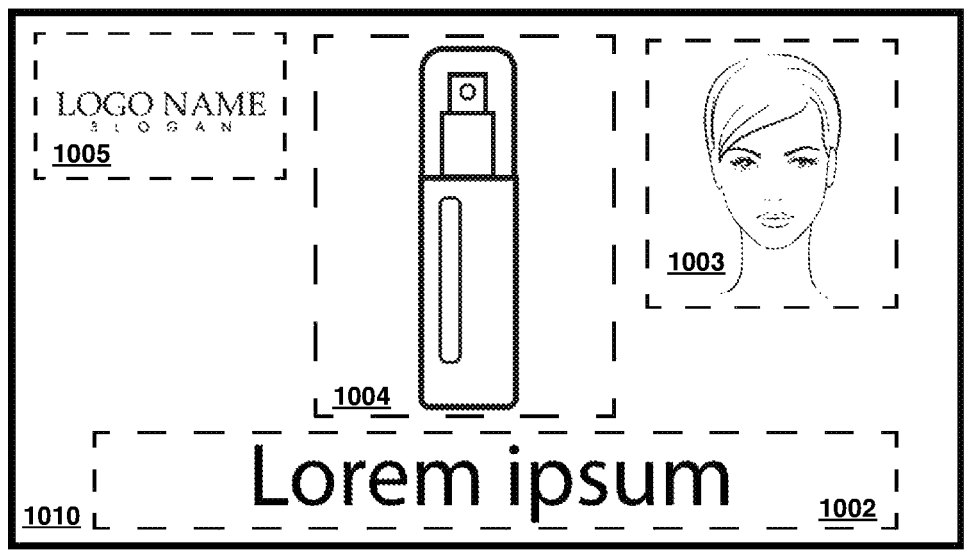
FIG. 10B is an illustration showing an exemplary arrangement of optimized additional elements according to a preferred embodiment of the invention.

In an exemplary embodiment, arrangement 1001 may rank items with an attention ranking from highest to lowest rank as 1003, 1005, 1002, and 1004. Further, arrangement 1001 may rank items with an importance ranking from highest to lowest as 1004, 1005, FIG. 10B is an illustration showing an exemplary arrangement 1010 of optimized additional elements according to a preferred embodiment of the invention. According to the embodiment, additional elements may be rearranged or optimized based on an attention ranking and/or an importance ranking. For example, elements 1002, 1003, 1004 and 1005 may have a designated ordered attention ranking of 1004, 1005, 1002, and 1003, and an important ranking of the same (i.e. 1004, 1005, 1002, and 1003). Accordingly, rearrangement 1010 illustrates an optimized arrangement of the additional elements emphasizing the most important elements. For example, arrangement 1010 emphasizes, in order of importance, product image (or one or more frames) of product 1004 and overlaid graphic 1005 (i.e. the company logo), text section 1002, and image (or sequence of frames) 1003 (for example, the user). Accordingly, an emphasis on, for example, the product and company are optimized to, for example, increase sales or present important elements in an optimized ranked fashion.

The skilled person will be aware of a range of possible modifications of the various embodiments described above. Accordingly, the present invention is defined by the claims and their equivalents.

What is claimed is:

1. A digital media arrangement system based on an attention condition comprising:
   a media compiler computer comprising a memory, an image capture component, a display component, one or more processors, and a plurality of programming instructions, the plurality of programming instructions stored in the memory and when executed by the one or more processor, cause the one or more processor to:
   receive a digital media segment from an administrator device;
   receive a plurality of metadata describing the digital media segment, the metadata comprising, at least, a priority marker for each frame of a plurality of frames and one or more set durations, each set duration being an amount of time associated to a set of frames;
   capture, by the image capture component, an image of a user;
   identify, using the image, a user profile associated to the user, the user profile comprising, at least, one or more attention conditions, and demographic information associate with the user;
   update the priority marker for each frame of at least a portion of the plurality of frames based on the user profile;
   dynamically compile a new digital media segment by resequencing, at least, a portion of the plurality of frames and additional elements, the rearrangement based on, at least, the updated priority markers associated to each frame;
   display, at a display component, the new digital media segment;
   wherein at least a portion of the plurality of frames, of the new digital media segment, are focused segments, the focused segments based on an importance ranking;
   wherein the focused segments are comprised of a restructured format by zooming one or more focal items.

2. The system of claim 1, wherein an attention condition is a duration of time based on a timed calculation of a user's head position being in an in-angle arrangement.

3. The system of claim 1, wherein an attention condition is an average duration of time based on a calculation of a plurality of durations of a user's head position in an in-angle arrangement.

4. The system of claim 1, wherein the attention condition is a duration of time, the duration of time associated to the user's attention based on a plurality of previously stored durations of time based on context.

5. The system of claim 1, wherein the new digital media segment comprises a sequence of frames wherein the total duration of time of the sequence of frames is equal to or less than a duration associated to the first attention condition.

6. The system of claim 1, wherein if a duration associated to the first attention condition is equal to or greater than the digital media segment, no rearrangement is done.

7. The system of claim 5, wherein a selection of a second attention condition is selected instead of the first attention condition, the selection based on external data.

8. The system of claim 7, wherein the additional elements are selected from a group consisting of a time-of-day, a location, demographic information associated to the user, mood, and behavior.

9. The system of claim 1, wherein the digital media segment and the plurality of metadata come from a database instead of an administrator device.

10. A computer-implemented method for computing a digital media arrangement, the method comprising the steps of:
receiving a digital media segment from a network connected administrator device;
receiving, from the administrator device via a network, a plurality of metadata describing the digital media segment, the metadata comprising, at least, a priority marker for each frame of a plurality of frames and a duration of a set of frames associated to a same priority marker;
capturing, by the image capture component, an image of a user;
identifying, using the image, a user profile associated to the user, the user profile comprising, at least, one or more attention conditions, and demographic information associate with the user;
update the priority marker for each frame of at least a portion of the plurality of frames based on the user profile;
dynamically compiling a new digital media segment by resequencing, at least, a portion of the plurality of frames and additional elements, the rearrangement based on, at least, the updated priority markers associated to each frame;
displaying, at a display component, the new digital media segment;
wherein at least a portion of the plurality of frames, of the new digital media segment, are focused segments, the focused segments based on an importance ranking;
wherein the focused segments are comprised of a restructured format by zooming one or more focal items.

11. The method of claim 10, wherein an attention condition is a duration of time based on a calculation of a user's head in an in-angle arrangement.

12. The method of claim 10, wherein an attention condition is an average duration of time based on a calculation of a plurality of durations of a user's head in an in-angle arrangement.

13. The method of claim 10, wherein the attention condition is a duration of time, the time associated to the user's attention based on historical data in context.

14. The method of claim 10, wherein the new digital media segment comprises a sequence of frames wherein the total duration of time of the sequence of frames is equal to or less than a duration associated to the first attention condition.

15. The method of claim 10, wherein if a duration associated to the first attention condition is equal to or greater than the digital media segment, no rearrangement is done.

16. The method of claim 14, wherein a selection of a second attention condition is selected instead of the first attention condition, the selection based on external data.

17. The method of claim 16, wherein the additional elements are selected from a group consisting of a time-of-day, a location, demographic information associated to the user, mood, and behavior.

18. The method of claim 10, wherein the digital media segment and the plurality of metadata come from a database instead of an administrator device.

* * * * *